Patented Dec. 2, 1924.

1,517,618

UNITED STATES PATENT OFFICE.

HUGH S. COOPER, OF CLEVELAND, OHIO, ASSIGNOR TO KEMET LABORATORIES COMPANY, INC., A CORPORATION OF NEW YORK.

ENAMEL COMPOSITION.

No Drawing.   Application filed January 11, 1921.   Serial No. 436,593.

*To all whom it may concern:*

Be it known that I, HUGH S. COOPER, a citizen of the United States, residing at Cleveland, in the county of Cuyahoga and State of Ohio, have invented certain new and useful Improvements in Enamel Compositions, of which the following is a specification.

This invention relates to enamel compositions suitable for producing opaque vitreous coverings on the surface of materials such as cast-iron and steel, and pertains particularly to opaquing ingredients for such compositions. Its object is to improve and cheapen the coating obtained.

Tin oxide has heretofore been the most important opaquing agent for high grade enamels. Sodium metantimonate, or "leukonin," has been used to a very considerable extent because of its comparative cheapness, but it gives to enamels a pinkish cast which detracts from their appearance. On account of the high cost of tin oxide, the supply of which is at times insufficient to equal the demand, a great deal of research has been carried out in attempts to find a satisfactory substitute, but in spite of the proposal of numerous materials to replace it, tin oxide is still the standard opacifier where enamels of the highest grade are desired.

I have found that a part or all of the tin oxide in enamel compositions now in use may be replaced by zirconium oxide, the quality of the product being maintained or improved, if certain conditions are observed. If the frit which is to form the basis of the enamel contains little or no uncombined silica, all or nearly all the tin oxide may be replaced by zirconium oxide and a better color and denser opacity thereby obtained. Enamels of this type are commonly used on cast-iron, and are frequently entirely free from uncombined silica, feldspar being the only silicious ingredient of the mix. Even where uncombined silica is present in the amount of 5% or even 10%, tin oxide may be replaced by zirconium oxide without serious depreciation of the quality of the enamel.

In some hard and highly resistant enamels employed on sheet steel, the content of uncombined silica is much higher, for example, 25% or thereabout. Such compositions tend to destroy the opacifying qualities of zirconium oxide, especially if used as the only opacifier. Measures which operate to decrease the solubility of the oxide improve the opacity, but even when such measures are employed, zirconium oxide cannot replace tin oxide, pound for pound, in this type of compositions. The solubility of the zirconium oxide may be decreased, for example, by igniting it, and by avoiding a too fine state of division, as by adding it toward the end of the milling operation.

In the case of enamels of high uncombined silica content, I have obtained the best results by replacing only a part of the tin oxide by zirconium oxide. In one instance, where the free silica content was about 25%, 10% of a mixture of 3 parts tin oxide to 2 parts of zirconium oxide were added, with a result which was notably better than when 10% of pure tin oxide was used in the same mix, the slight cream tinge which tin oxide produces being compensated by the bluish tendency which is characteristic of zirconium oxide. It will be understood that I am not limited to the proportions above recited, as these may be varied depending on the physical condition of the zirconium oxide used and the free silica content and other characteristics of the mix.

Any of the mixtures of tin oxide and zirconium oxide hereinbefore referred to may be in part replaced by sodium metantimonate with a corresponding economy, the antimony compound being a comparatively cheap material. It has been shown that under certain condition the tin oxide content of the tin-zirconium combination may approach or reach zero, while mixes high in free silica require a considerable amount of tin oxide to produce good opacity So- dium metantimonate may be introduced into any of these mixtures. There is a distinct cooperation between the antimony and zirconium compounds, as antimony produces a pinkish cast in enamels and this is compensated by the bluish tendency of the zirconium.

When tin oxide is absent, or present in small amounts, the proportion of metantimonate to zirconium oxide may vary between rather wide limits. Mixtures of the two ingredients in which the percentage of metantimonate varies from 15 to 85 give good results under suitable conditions. My preferred mix is one containing 20% to 40% metantimonate. The best proportions known to me are about 3 parts metantimonate to 5 parts zirconium oxide. When tin oxide, sodium metantimonate and zirconium oxide are all used together to produce opacity, the proportions may vary in accordance with the foregoing. A mixture which has given excellent results and is here cited merely by way of example, contains two parts of sodium metantimonate and one part each of tin oxide and zirconium oxide.

It will be noted that tin and antimony, the metals which have by far the most extensive application as opacifiers in enamels, lie very close together in the atomic weight series, their weights differing by only about one 'unit in the usual scale and approximating the number 119. It is the compounds of these two elements which I have found to cooperate with zirconium oxide to the best advantage. While I can give no explanation of this circumstance, it is well known that closely approaching atomic weights often foreshadow similar chemical properties, and I have used the atomic weight of these elements to define in the claims a group which I desire to cover generically.

I claim:

1. An enamel composition containing zirconium oxide and an opacifying compound of antimony.

2. An enamel composition containing zirconium oxide and an opacifying compound of a metal having an atomic weight of about 119, in about the proportion of three weights to two.

3. An enamel composition containing zirconium oxide, tin oxide and an antimony compound.

4. An enamel composition containing zirconium oxide and an antimonate.

5. An enamel composition containing zirconium oxide and sodium metantimonate in the proportion of about five parts to three.

In testimony whereof, I affix my signature.

HUGH S. COOPER.